United States Patent
Lachwani et al.

(10) Patent No.: US 8,762,746 B1
(45) Date of Patent: Jun. 24, 2014

(54) POWER MANAGEMENT IN ELECTRONIC DEVICES

(75) Inventors: Manish Lachwani, Sunnyvale, CA (US); David Berbessou, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 410 days.

(21) Appl. No.: 13/069,297

(22) Filed: Mar. 22, 2011

(51) Int. Cl.
*G06F 1/26* (2006.01)

(52) U.S. Cl.
USPC .......................................... 713/300; 713/310

(58) Field of Classification Search
None
See application file for complete search history.

(56) References Cited

U.S. PATENT DOCUMENTS

| | | | |
|---|---|---|---|
| 7,890,783 B2 * | 2/2011 | Tupman et al. | 713/300 |
| 2002/0169915 A1 * | 11/2002 | Wu | 710/305 |
| 2003/0052547 A1 * | 3/2003 | Fischer et al. | 307/154 |
| 2003/0212841 A1 * | 11/2003 | Lin | 710/62 |
| 2010/0235546 A1 * | 9/2010 | Terlizzi et al. | 710/16 |
| 2011/0276734 A1 * | 11/2011 | Helfrich | 710/105 |

* cited by examiner

*Primary Examiner* — Paul Yanchus, III
(74) *Attorney, Agent, or Firm* — Lee & Hayes, PLLC

(57) ABSTRACT

Some implementations provide power management techniques for an electronic device that receives power through a USB port. The device may receive power from various different power sources such as a PC, USB hub, and various types of power adapters. To identify a type of power adapter connected to the USB port, the device's USB device controller may be reconfigured to operate in a host mode. A pull-up or pull-down may be placed on one of the D+ or D− lines of the USB port for determining whether the lines are shorted or floating. When the lines are shorted, the power source may be identified as a first type of power adapter that provides a known level of current. When the lines are not shorted, the values of the lines may be compared with known values for one or more pull-ups or pull-downs to attempt to identify other known power adapters.

25 Claims, 5 Drawing Sheets

POWER MANAGEMENT IN ELECTRONIC DEVICES

BACKGROUND

People commonly use electronic devices for consuming digital media content, communicating, executing applications, and performing numerous other functions. Examples of such electronic devices may include eBook reader devices, cellular telephones and smart phones, tablet computers, portable media players, netbooks, personal digital assistants, and navigation devices, to name a few. These electronic devices rely on electrical power to function. Many such devices can receive power through a universal serial bus (USB) port. For example, a device may receive power through a USB port for charging a battery and/or for powering the device. In some cases, the power may be supplied by another device, such as by connection to a host USB port of a personal computer (PC) or USB hub. In other instances, the power may be supplied by a power adapter that plugs into a wall socket or an automobile 12-volt outlet. Typically, power adapters are specifically designed for charging a particular electronic device. Thus, the power adapter for a first electronic device from a first manufacturer may not be compatible with a second electronic device from a second manufacturer even though the power adapter can be connected to the second device through a USB connection.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Power from Multiple Power Sources

Figure 1:
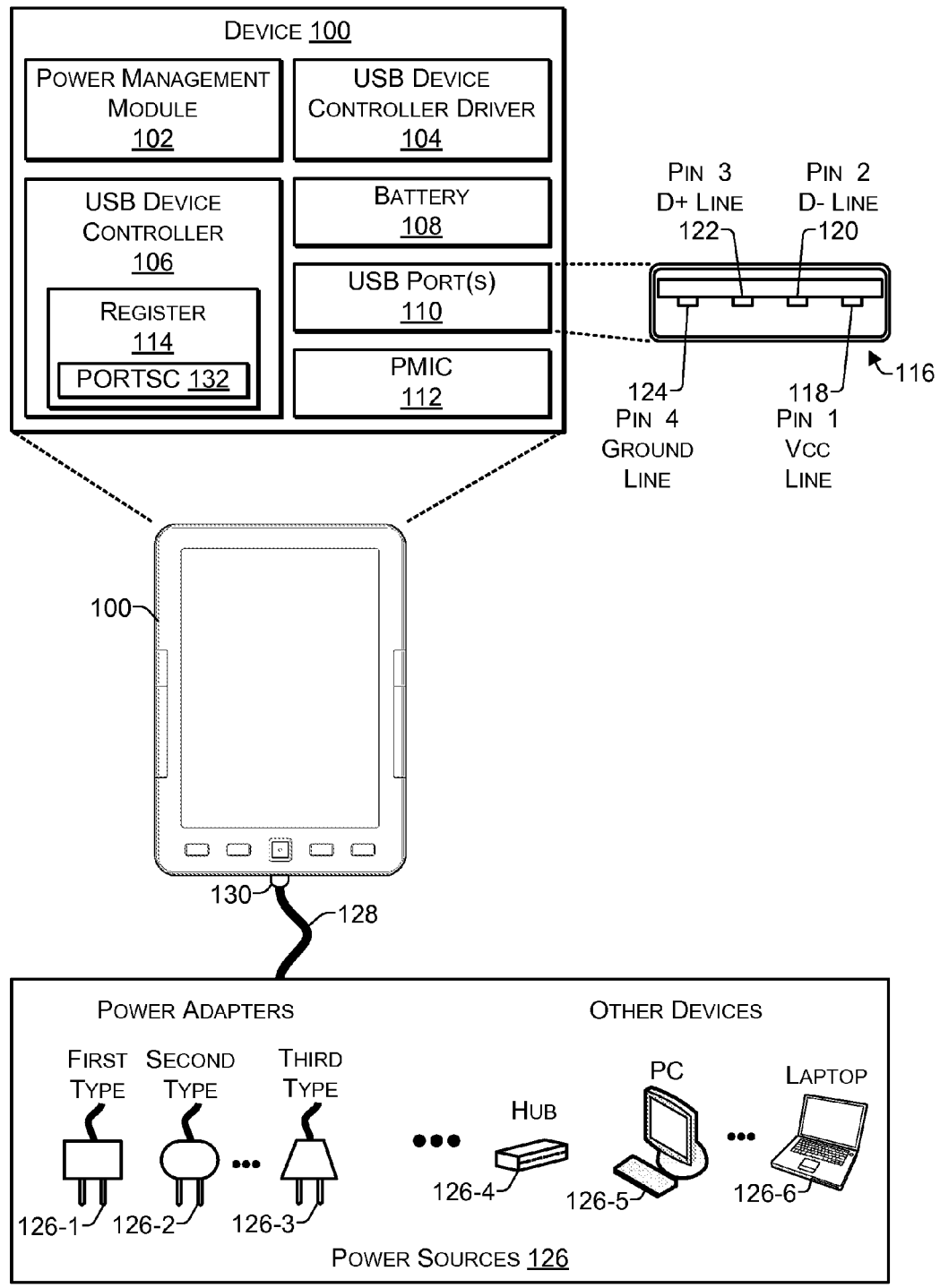
FIG. 1 illustrates an example electronic device incorporating power management techniques for connecting to multiple different types of power sources according to some implementations.

This disclosure includes techniques and arrangements for enabling an electronic device to receive and manage power. For example, the device may receive power through a USB port to charge a battery and/or to power the device directly. In some implementations, the device is able to identify and receive power from multiple types of power sources. Further, the amount of current that the device draws from a particular power source may depend on the type of power source. For example, according to the USB specification (e.g., Universal Serial Bus Revision 3.0 Specification, released Nov. 12, 2008, by USB Implementers Forum, Inc., Portland, Oreg., USA) a high-speed host USB port on a PC should supply approximately 500 mA. Further, according to the USB specification, a low-speed host USB port and a full-speed host USB port on a PC should only supply 100 mA. Additionally, if an electronic device connected to a USB port of a host PC requests more current than the USB port can supply, an over-current condition may be detected. In such a situation, the host PC may shut off the host USB port until the next power cycle of the host PC. Further, different types of power adapters are designed to provide different levels of current through a USB connection. However, attempting to draw too much current may damage the power adapter or the device. Hence, in some implementations, the device herein may determine the type of power source connected to a USB port before setting the level of current to be drawn by the device through the USB port.

In some implementations, the device may receive power from any of numerous different types of power sources, many of which have different specific current supply limits. For example, not all power adapters correctly follow the power supply requirements of the USB specifications. Furthermore, not all PC chipsets correctly implement host USB ports according to the USB specification. Accordingly, implementations herein may take measures to prevent damage to the device, the device battery and/or the power source by attempting to identify a connected power source before setting the level of current to be drawn. Some examples of power sources may include power adapters that may be plugged into a wall socket or an automobile outlet. Other power sources may include a PC, a USB hub, or other devices having host USB ports configured to supply power. For example, some power adapters may supply current levels as high as 1.5 A, while other power adapters are designed to supply a current level of 800-1000 mA, and yet other power adapters are designed to supply a maximum of 500 mA or less. Drawing a higher current level is desirable as this enables faster charging of a battery of the device and/or contemporaneously using the device while charging the battery.

According to the USB specification, a USB port includes D+ and D− lines that an are typically used for transferring data between devices (D+ may also be referred to herein as "DP" while D− may also be referred to as "DM"). Some implementations herein may identify a type and/or model of a power adapter based on conditions determined through the D− and D+ lines. For example, a first type of power adapter may provide a first identifiable condition on the D+ and D− lines in which the D+ and D− lines are shorted. When this condition is present, if the D+ line is raised high by applying a pull-up to the D+ line, then the D− line will follow by a similar amount. Similarly, if the D+ line is pulled low, the D− line will follow low. Conventionally, a pull-up is applied using a resistor of a predetermined resistance (e.g., 1.5 kΩ) and a known voltage source (e.g., 3.3V) for applying a pull-up of a desired amount on the D+ or D− line. Similarly, a pull-down may be applied by placing a resistor of a predetermined resistance between D+ and/or D− lines and a voltage drain. Accordingly, by applying a pull-up or pull-down on the D+ or D− line, and then determining the state of the other line, D− or D+, respectively, implementations herein can identify several different types of power adapters.

When the D+ and D− lines are shorted, the USB specification requires the power adapter to be able to supply a minimum of 800 mA. Thus, a first type of power adapter herein has the D+ and D− lines shorted. According to some implementations, the first type of power adapter may be identified by placing a pull-up on one of the D+ or D− lines and checking to see if the other line follows. A second type of power adapter herein may have floating D+ and D− lines. According to some implementations, the second type of power adapter may be identified by applying one or more pull-ups on one of the D+ or D− lines and checking the value of the other line against known values for known power adapter models. Thus, using this technique, a number of different known models of power adapters from various manufacturers may be identified. Once a model of power adapter has been identified, the rated current supply level may be obtained, such as from a lookup table. A third type of power adapter does not have the D+ or D− lines shorted, may also have floating D+ and D− lines, and is not identifiable by applying various different pull-up values. In some implementations, the third type of adapter may be used by drawing only a default safe level of current.

Under the USB specification, a device USB port is managed by a USB device controller operating in a device controller mode, while a USB host has a host USB port managed by a USB host controller that operates in a host controller mode. For example, standard USB connections use a master/slave architecture in which a USB host acts as the protocol master, and a USB device acts as the protocol slave. Under this configuration, only the USB host is permitted to schedule and configure data transfers over the connection. The USB device cannot initiate data transfers and is limited to merely responding to data requests given by the USB host. Thus, according to the USB standard, a USB device cannot typically apply a pull-up or pull-down on a D+ or D− line when the USB device controller of the device is operating in a device controller mode.

USB On-The-Go ("USB OTG"), is a part of the USB specification that allows devices that generally fulfill the role of being a slave USB device to become the host themselves when paired with another USB device. Thus, USB OTG enables a USB device controller of a device to assume either a host controller mode or a device controller mode. Typically, to enable connection to a PC, hub, or power adapter, an electronic device has the USB device controller operating in the device controller mode. However, some implementations herein provide for temporarily re-setting the USB device controller of the electronic device from the device controller mode to the host controller mode. When the USB device controller has been reset to the host controller mode, implementations of the electronic device herein may then apply a pull-up or pull-down to one of the D+ or D− lines and can then determine the state of the other D− or D+ line, respectively, such as by reading a register in the USB device controller. When a connected power adapter has been identified (i.e., as the first type, the second type, or the third type), the current to be drawn can be set to the proper level corresponding to the power adapter type, and the USB device controller on the electronic device may be reset back to the device controller mode to enable proper operation of the device USB port.

The foregoing discussion is provided for the reader's convenience and is not intended to limit the scope of the claims or the disclosure herein. Furthermore, the techniques described herein may be implemented in numerous different manners and contexts. Several example implementations and contexts are provided with reference to the figures, as described below in more detail. However, the following implementations and contexts are but a few of many that will be apparent to those of skill in the art in light of the disclosure herein.

Example Device

FIG. 1 illustrates an example electronic device 100 according to some implementations. The device 100 includes a power management module 102, a USB device controller driver 104, a USB device controller 106, a battery 108, at least one USB port 110, and a power management integrated circuit (PMIC) 112. The power management module 102 may include various drivers, logic and/or processor-executable instructions for implementing the power management techniques and arrangements described herein. For instance, in some implementations, the power management module 102 may serve as or may include a charger driver that interacts with the PMIC 112 for recognizing a power source that is connected to the device 100, and for setting a level of current to be drawn from the power source.

The USB device controller driver 104 may provide functionality for controlling and managing the USB device controller 106. For example, in some implementations, the power management module 102 may send instructions to the USB device controller driver 104 to cause the USB device controller driver to change a mode of the USB device controller 106 between a device controller mode and a host controller mode, as mentioned above. Further, the USB device controller 106 may include a register 114, which may be a file (e.g., a physical register file) that indicates various states and conditions of the USB port 110 that is controlled by the USB device controller 106.

According to the USB standard, the USB port 110 may include a receptacle 116 having at least four connecting pins, namely a first pin for a power (Vcc) line 118 for transmitting power, a second pin for a D− line 120 for transmitting data, a third pin for a D+ line 122 for transmitting data, and a fourth pin for a ground line 124 that may connect to ground. Furthermore, while a standard USB Type-A receptacle is illustrated in FIG. 1 for discussion purposes, implementations herein may incorporate any type of USB receptacles, including Type-B, Mini-A, Mini-B, Micro-A or Micro-B.

In some implementations, the device 100 may connect to various different types of power sources 126 through a USB cable 128 and a USB plug 130 that connects to the USB port 110 through the receptacle 116. In other implementations, the USB cable 128 may be eliminated and the receptacle 116 of the device 100 may plug directly into a power source 126, such as in the case of connecting the device 100 to a docking station, charging base, or the like (not shown).

The power sources 126 may include power adapters and other devices able to supply power through a USB connection. In some implementations, the power sources 126 may include at least a first type of power adapter 126-1, a second type of power adapter 126-2, and a third type of power adapter 126-3. As mentioned above, the first type of power adapter 126-1 has the D+ and D− lines shorted, and according to some implementations herein, may be identified by placing a pull-up on one of the D+ or D− lines and checking to see if the other line follows. The second type of power adapter 126-2 may have floating D+ and D− lines. According to some implementations herein, the second type of power adapter 126-2 may be identified by applying one or more pull-ups on one of the D+ or D− lines and checking the value of the other line against values previously determined for known power adapter models. For example, the response of various power adapter models to various pull-up values may be determined in advance and stored in a table or other data structure. The table may be referred to during an attempt to identify the power adapter model. When the model of a power adapter has been identified, the rated current supply level may also be obtained from the table or other data structure. The third type of power adapter 126-3 does not have the D+ or D− lines shorted (i.e., the D+ and D− lines may be floating), and is not identifiable using various different pull-up values. For example, the third type of power adapter 126-3 may be an unknown model, or may not be able to be positively identified for some other reason. In some implementations, the third type of power adapter may be used by drawing only a default level of current considered to be safe for both the device 100 and the power adapter.

The power sources 126 may also include one or more other devices, such as a USB hub 126-4, a PC 126-5, a laptop 126-6, and so forth. Further, while FIG. 1 provides several non-limiting examples of power sources 126, implementations herein are not limited to any particular type of power source 126 as long as the power source 126 is able to provide power to the device 100 through a USB connection.

As an example, when a power source 126 is connect to the USB port 110, the power source 126 may be identified based on the current state of the USB data lines D+ and D−. For example, when different types of power sources 126 are connected, the D+ and D− lines will have different specific states. These states may be detected to help define and identify the type of the power source 126 based on the USB specification. When a power source 126 has been detected and identified, the level of current to be drawn from the power source 126 can be set by the power management module 102 through the PMIC 112. In some implementations, the state of the D+ and D− lines may be determined by accessing the register 114 of the USB device controller 106. For example, according to the USB specification, the register 114 may include a port status/control register (PORTSC) 132, which can indicate the state of the USB port 110. In some implementations, the PORTSC register 132 may include line status bits (LS bits) that indicate a status of each of the D+ and D− lines in the USB port 110.

The PMIC 112 may manage charging of the battery 108 using the power received from the power source 126, such as for setting a level of current to intake and for preventing overcharging and damage to the battery 108. The PMIC 112 may also notify the power management module 102 when a power source 126 is connected to the USB port 110 or disconnected from the USB port 110, and may be responsive to instructions from the power management module 102 for setting the level of current to draw from the power source 126.

In some implementations, the first type of power adapter 126-1 may short the D+ and D− lines and may pull both the D+ and D− lines high. In these implementations, both the D+ and D− lines are set to 1 in the PORTSC register 132, i.e., the LS bits in the PORTSC register 132 should indicate "11" (or "0x3" in hexadecimal). The first type of power adapter 126-1 may internally pull either the D+ line high or the D− line high by attaching a pull-up resistor to one the two lines. Since the D+ and D− lines are shorted, a pull-up on one line results in a pull-up on the other line. The USB device controller 106 detects this and sets the corresponding LS bits in the PORTSC register 132 to have a value of "1" for each of the D+ and D− lines.

In some implementations, the second type and third type of power adapters 126-2 and 126-3 may have floating D+ and D− lines, which means that the D+ and D− lines do not have defined values. For example, some of the second and third type of power adapters 126-2 and 126-3 may not place any pull-up or pull-down on either of the D+ and D− lines. When the D+ and D− lines are floating, the USB device controller 106 may still set the LS bits in the PORTSC register 132 to a value of "1" for each of the D+ and D− lines even though the lines are not shorted. Accordingly, in some implementations herein, it is insufficient to rely solely on the state of the PORTSC register 132 for identifying the first type of power adapter 126-1 that has shorted D+ and D− lines from the second type and third type of power adapters 126-2 and 126-3 that have floating D+ and D− lines. For example, incorrectly identifying a second or third type of power adapter as the first type of power adapter 126-1 may result in drawing too much current from the second or third type of power adapter 126-2 or 126-3, which may damage the second or third type of power adapter 126-2 or 126-3 and/or the device 100.

Consequently, as discussed above, in some implementations herein, the device 100 may apply one or more pull-ups on D+ or D− lines to determine whether the connected power source 126 is a first type of power adapter 126-1, a second type of power adapter 126-2, or a third type of power adapter 126-3. Further, in order to enable the application of the one or more pull-ups, some implementations herein may temporarily reset the USB device controller 106 of the device 100 from a device controller mode to a host controller mode. In addition, based on knowledge of D+ and D− lines settings of the second type of power adapters 126-2, some implementations herein may identify a known second type of power adapter 126-2 and may set the level of intake current according to specifications for the identified second type of power adapter. Additionally, in some implementations, when a power adapter cannot be identified (i.e., the third type of power adapter 126-3), the current level may be set to a default maximum level considered to be safe for both the power adapter and the device 100. Furthermore, implementations herein also provide techniques for identifying a PC or other device connected to the USB port 110 and for identifying whether the USB port 110 is connected to a high-speed port, a full-speed port, or a low-speed port.

Example Process for Power Management

Figure 2:
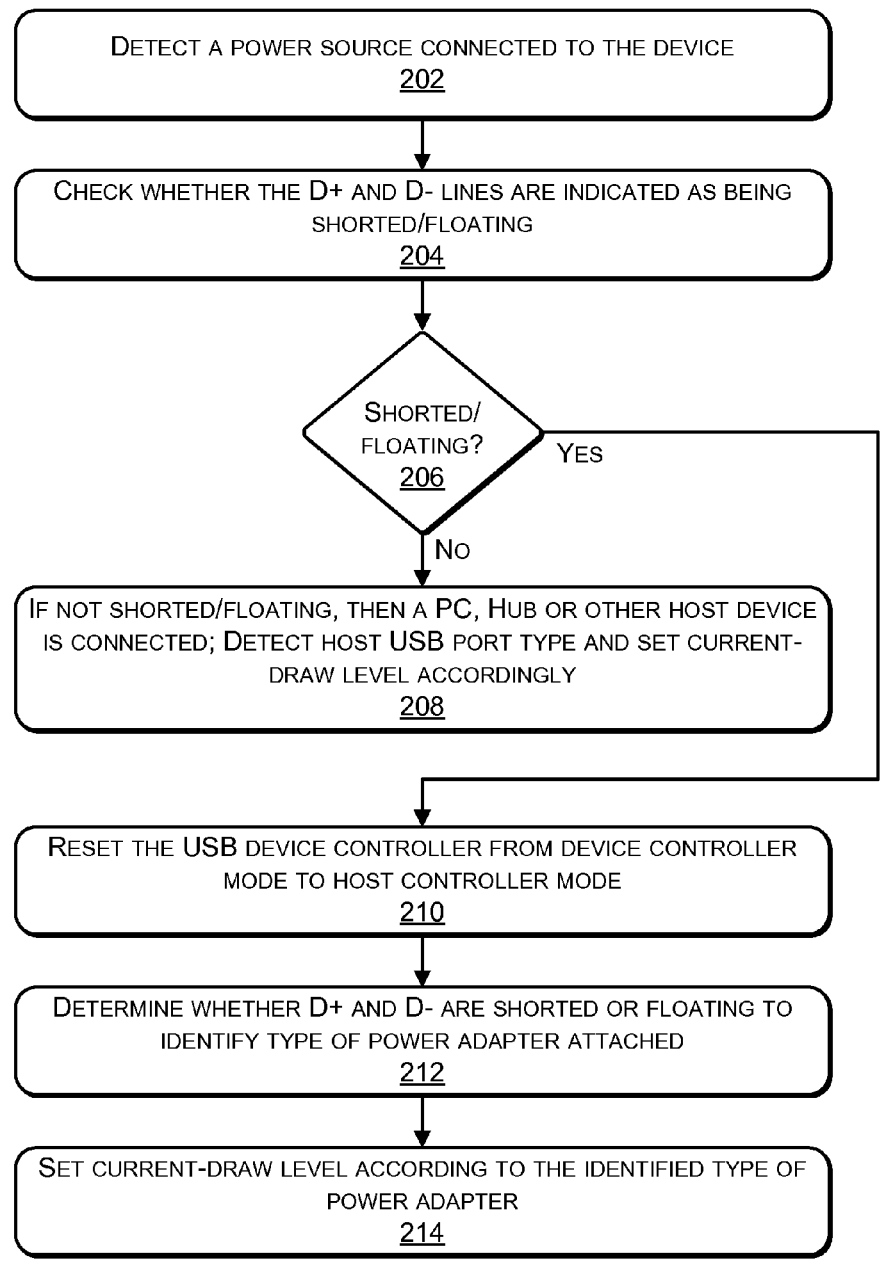
FIG. 2 depicts a flow diagram illustrating an example process for power management according to some implementations.

FIG. 2 illustrates an example process 200 for power management according to some implementations. The process 200, as well as the process 400 of FIGS. 4A-4B described below, is illustrated as a logical flow diagram, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The process 200 is described with reference to the electronic device of FIG. 1, although other devices, architectures and systems may implement this process.

At block 202, the device 100 may detect that a power source has been connected to the device. For example, the PMIC 112 may detect through the USB device controller 106 that a power source 126 has been connected to the USB port 110. The PMIC 112 may notify the power management module 102 that the power source 126 has been connected to the USB port 110.

At block 204, the device 100 may determine whether the D+ and D− lines are indicated to be shorted (or floating). For example, the power management module 102 may determine from the USB device controller 106 whether the D+ and D− lines are indicated as being shorted. In some implementations, the power management module 102 may check the PORTSC register 132 in the USB controller register 114 to determine whether the LS bits for the D+ and D− lines are both set to a value of "1," and if so, the power management module 102 may assume that the D+ and D− lines are shorted/floating.

At block 206, if the power management module 102 determines that the D+ and D− lines are not shorted/floating, then in some implementations, the power management module 102 assumes that the device 100 is connected to a host USB port on another device such as a PC, hub, or the like, and the process goes to block 208. On the other hand, if the PORTSC register 132 indicates that the D+ and D− lines are shorted or floating, then in some implementations the power management module 102 assumes that the device 100 is connected to a power adapter, and the process goes to block 210.

At block 208, when the D+ and D− lines are not shorted or floating, then the power management module 102 assumes that the device is connected to a host USB port on another device such as a PC or USB hub. The power management module 102 detects whether the host USB port is one of a low-speed USB port, a full-speed USB port, or a high-speed USB port. For example, as described additionally below, the power management module 102 may determine from the USB device controller 106 whether the host USB port is low-speed, full-speed, or high-speed. In some implementations, this determination may be made by checking the LS bits in the PORTSC register 132. In the case of a low-speed or full-speed USB port, some implementations herein may set the current-draw level to 100 mA, while in the case of a high-speed USB port, some implementations herein may set the current-draw level to 500 mA.

At block 210, the power management module 102 resets the USB device controller 106 from device controller mode to host controller mode. For example, the power management module 102 may cause the USB device controller driver 104 to stop the USB device controller 106 and restart the USB device controller 106 in a host controller mode.

At block 212, the device 100 determines whether the D+ and D− lines are shorted or floating. For example, the power management module 102 may cause the USB device controller 106 to place a pull-up on one of the D+ or D− lines. If the other one of the D− and D+ lines follows the pulled-up line, then the D+ and D− lines are shorted, which indicates that the power adapter is the first type of power adapter 126-1. For example, if a pull-up of a predetermined amount is placed on the D+ line, and a check of the D− line shows a pull-up of the same amount, then the D+ and D− lines are shorted. On the other hand, if the D− line shows a pull-up of a different amount then the D+ and D− lines are not shorted, but instead are floating, which indicates a power adapter of the second type 126-2 or the third type 126-3. Furthermore, in some implementations, pull-ups of different levels they may be applied to the D+ line and corresponding readings taken of the D− line to enable identification of particular brands and models of the second type of power adapters 126-2. For example, for a first brand of the second type of power adapter, a pull-up of a first amount on the D+ line may result in a first value on the D− line, while for a second brand of third-party power adapter, the pull-up of the first amount may result in a different value on the D− line. Accordingly, various different brands and models of the second type of power adapters 126-2 may be identified using this technique. If the power adapter cannot be identified, then it is considered to be the third type of power adapter 126-3.

At block 214, the device sets the current-draw level according to the identified type of power adapter. In some implementations, the power management module 102 may instruct the PMIC 112 as to the desired level of current to draw from the power adapter. For example, when the first type of power adapter is identified, the current-draw level may be set according to a first current value at which the first type of power adapter is rated. In some implementations, this may be a minimum of 800 mA. Similarly, when a particular brand and model of the second type of power adapter is identified, the current draw level may be set according to a particular current value at which the identified second type of power adapter is rated. When the device 100 is unable to identify a power adapter as the first or second type, i.e., the third type of power adapter 126-3, the current draw level may be set at a safe default current level, such as 500 mA, for example.

Example Device Components

Figure 3:
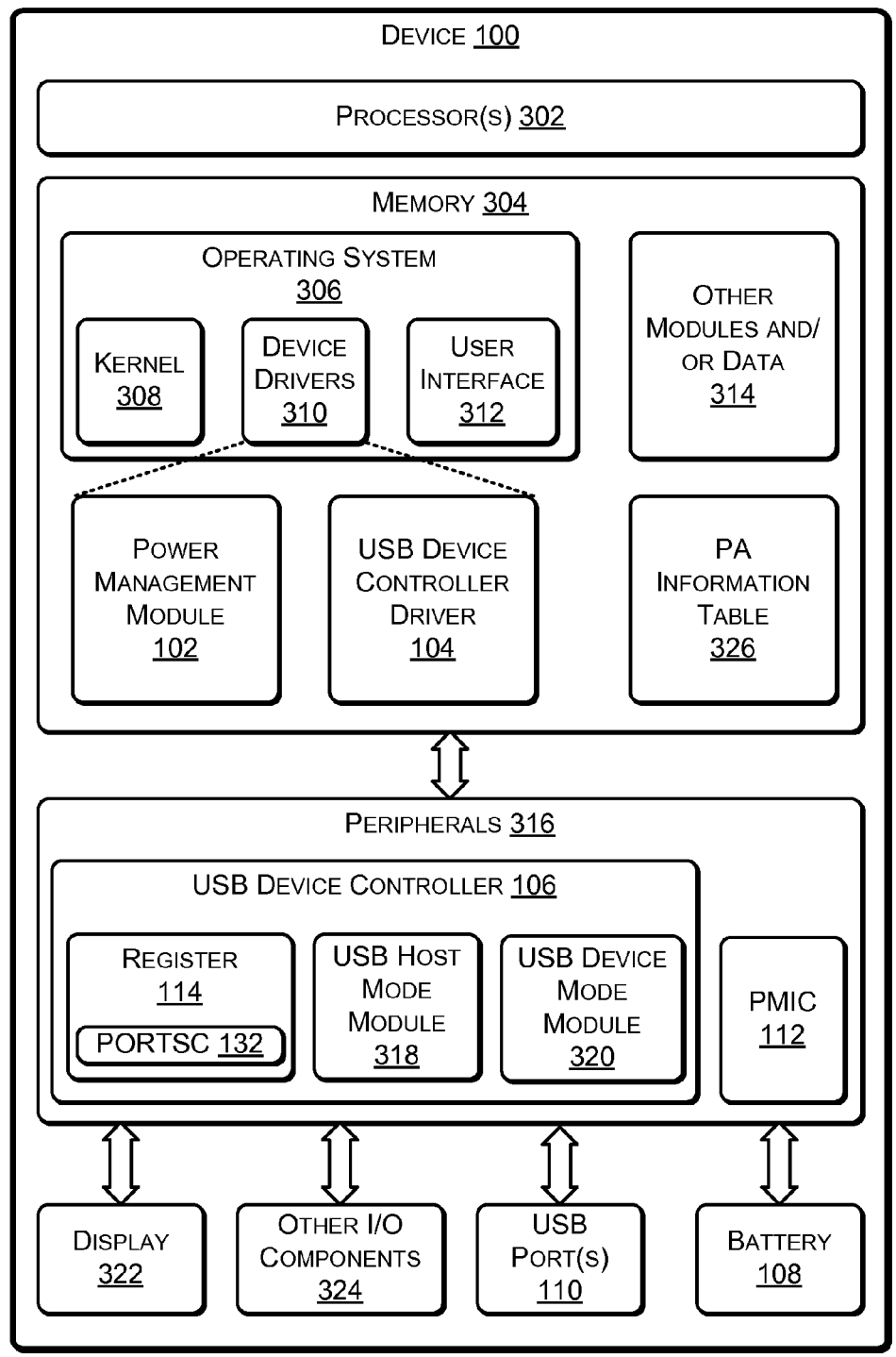
FIG. 3 is a block diagram illustrating selected example modules and components of the electronic device.

FIG. 3 is a block diagram 300 of select example components of the electronic device 100 according to some implementations. In some instances, the device 100 may be a portable or hand-held electronic device. In other instances, the device 100 may be a fixed or generally non-portable device. Non-limiting examples of devices 100 that may implement the power management techniques herein may include eBook readers, cellular phones, smart phones, portable media players, navigation devices, tablet computing devices, gaming devices, netbooks, cameras and so forth.

In a very basic configuration, the device 100 includes or accesses components such as at least one processor 302 and a memory 304. Each processor 302 may itself comprise one or more processors or cores. Depending on the type and configuration of the device 100, the memory 304 may be an example of non-transitory computer-readable media and may include volatile and nonvolatile memory, mass storage, or the like. For instance, the memory 304 may include, but is not limited to, RAM, ROM, EEPROM, flash memory, solid-state drives, magnetic disks, or other memory or storage technology. Thus, the memory 304 may include any medium that can be used to record or store computer-readable instructions and data that can be accessed by the device 100.

The memory 304 may store any number of functional components that are executable on the processor 302, as well as data, applications and/or content items that are used or rendered by the device 100. Thus, the memory 304 may store an operating system (OS) 306 that is executable by the processor 302. For example, the operating system 306 may include a kernel 308 operatively coupled to one or more device drivers 310. In some implementations, the operating system may provide a user interface 312 for enabling a user to access functions and features of the device 100. In some implementations, depending on the type of the device 100 and the intended use, the memory 304 may also maintain other modules and/or data 314, such as executable applications or programs and associated data, content items, databases, user settings, configuration files, device status information, and so forth.

FIG. 3 further illustrates that the memory 304 stores the power management module 102 and the USB device controller driver 104. In the illustrated implementation, the power management module 102 and the USB device controller driver 104 are included in the operating system 306 as being part of device drivers 310. However, in other implementations, one or both of power management module 102 and USB device controller driver 104 may be separate modules from the operating system 306.

Power management module 102 and the USB device controller driver 104 may be executed on the processor 302 to interact with one or more peripherals 316, such as the USB device controller 106 and/or the PMIC 112. In this example, USB device controller 106 includes a USB host mode module 318 and a USB device mode module 320. The USB device mode module 320 may be selected to operate the USB device controller 106 in the device controller mode, while the USB host mode module 318 may be selected to operate the USB device controller 106 in the host controller mode.

The PMIC 112 may be any suitable power management integrated circuit. One example of a suitable PMIC is available from Freescale Semiconductor, Inc. of Austin, Tex., USA, although implementations herein are not limited to any particular PMIC. Further, in some implementations of the device 100, the PMIC 112 may be eliminated, and the power management module 102 may directly perform the power management functions of the PMIC 112.

FIG. 3 further illustrates the device 100 as including the at least one USB port 110 and the battery 108. The battery 108 may be a rechargeable battery, such as a nickel-cadmium, lithium ion, nickel-metal hydride, or other suitable type of rechargeable battery. Further, in some implementations, the battery 108 may be eliminated, and the device 100 may be powered directly through the USB port 110.

Additionally, in some implementations, the device 100 may include one or more displays 322 and/or other input/output (I/O) devices 324. For example, when a display 322 is included, the display may be passive, emissive or any other form of display, and may include a touchscreen. When multiple displays are present, these displays may be of the same or different types. The device 100 may further be equipped with various other input/output (I/O) components 324. In some implementations, the other I/O components 322 may include various user-actuable controls, a keypad or keyboard, one or more speaker, a microphone, a camera, and so forth. In some implementations, the other I/O components 322 may include a communication interface that may support both wired and wireless connection to various networks, such as cellular networks, radio, WiFi networks, short-range or near-field networks (e.g., Bluetooth®), infrared signals, and so forth. The device 100 may have additional features or functionality not illustrated. For example, a global positioning system (GPS) device, an external storage interface, communication interfaces, a projector, and so forth.

Additionally, in some implementations, the memory 304 may maintain a power adapter (PA) information table 326. As mentioned above, in some implementations, a particular third party manufacturer and/or model of the second type of power adapter 126-2 may be positively identified by applying one or more pull-ups on (or pull-downs) one of the D+ or D− lines and checking the value of the other line against values previously determined for known power adapter manufacturers and models. For example, the response of various power adapter models to various pull-up values may be determined in advance and stored in the PA information table 326 or other suitable data structure. The rated current level for each power adapter model may also be stored in the PA information table 326. The PA information table 326 may be referred to by the power management module 102 during an attempt to identify a connected power adapter using various different pull-up values and checking the values of the D+ or D− lines against the values stored in the information table 326. When the manufacturer and/or model of a particular power adapter is positively identified, the rated current supply level for the particular power adapter may also be obtained from the PA information table 326.

Various instructions, methods and techniques described herein may be considered in the general context of computer-executable instructions, such as program modules stored on computer-readable media, e.g., memory 304, and executed by the processor 302. Generally, program modules include routines, programs, objects, components, data structures, etc. for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media. Further, the example device 100 illustrated in FIGS. 1 and 3 is just one non-limiting example of a suitable electronic device according to some implementations. Numerous other implementations, variations and configurations will be apparent to those of skill in the art in view of the disclosure herein.

Example Process for Power Management

Figure 4A:
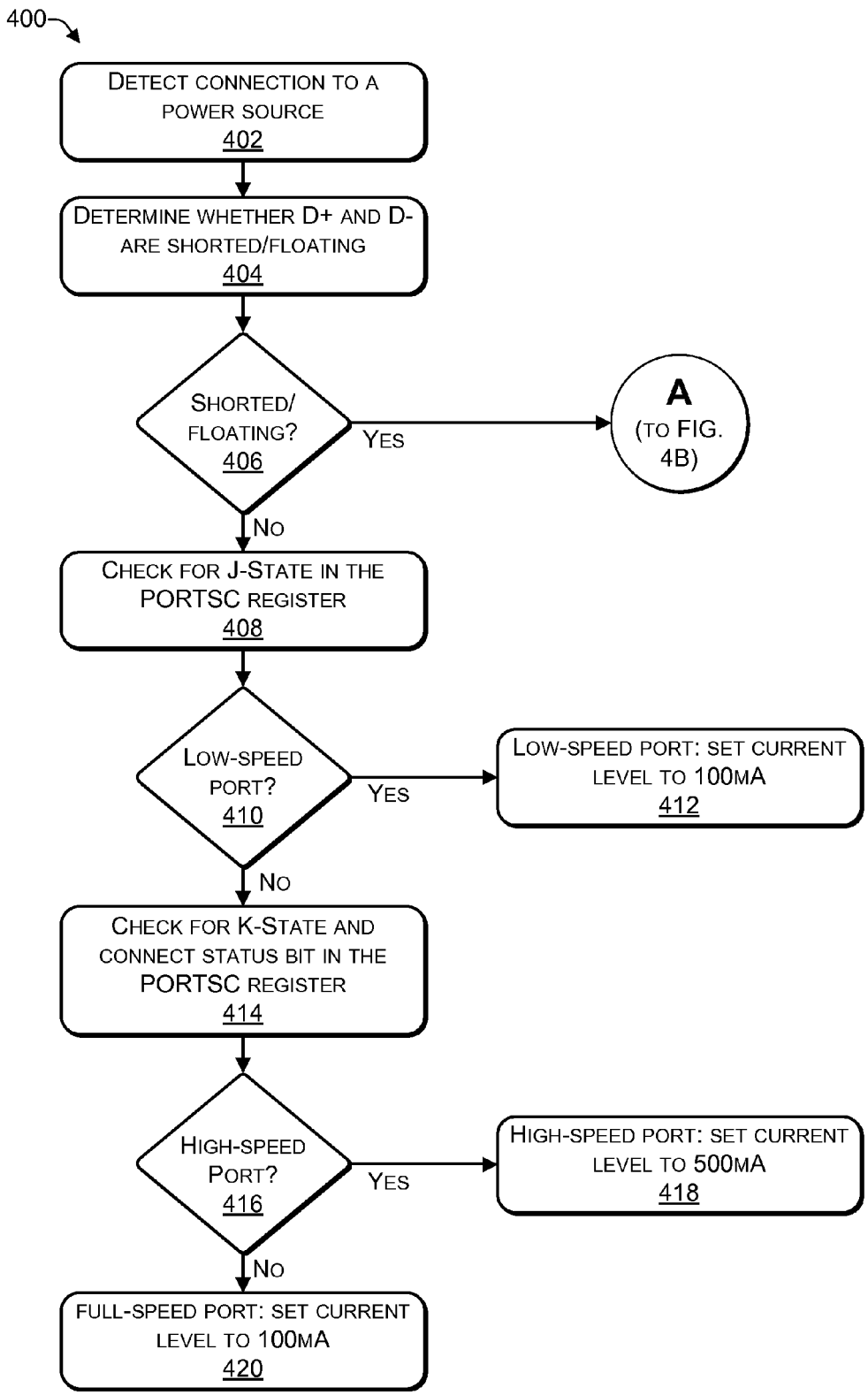
FIGS. 4A-4B depict a flow diagram illustrating an example process for power management according to some implementations.
Figure 4B:
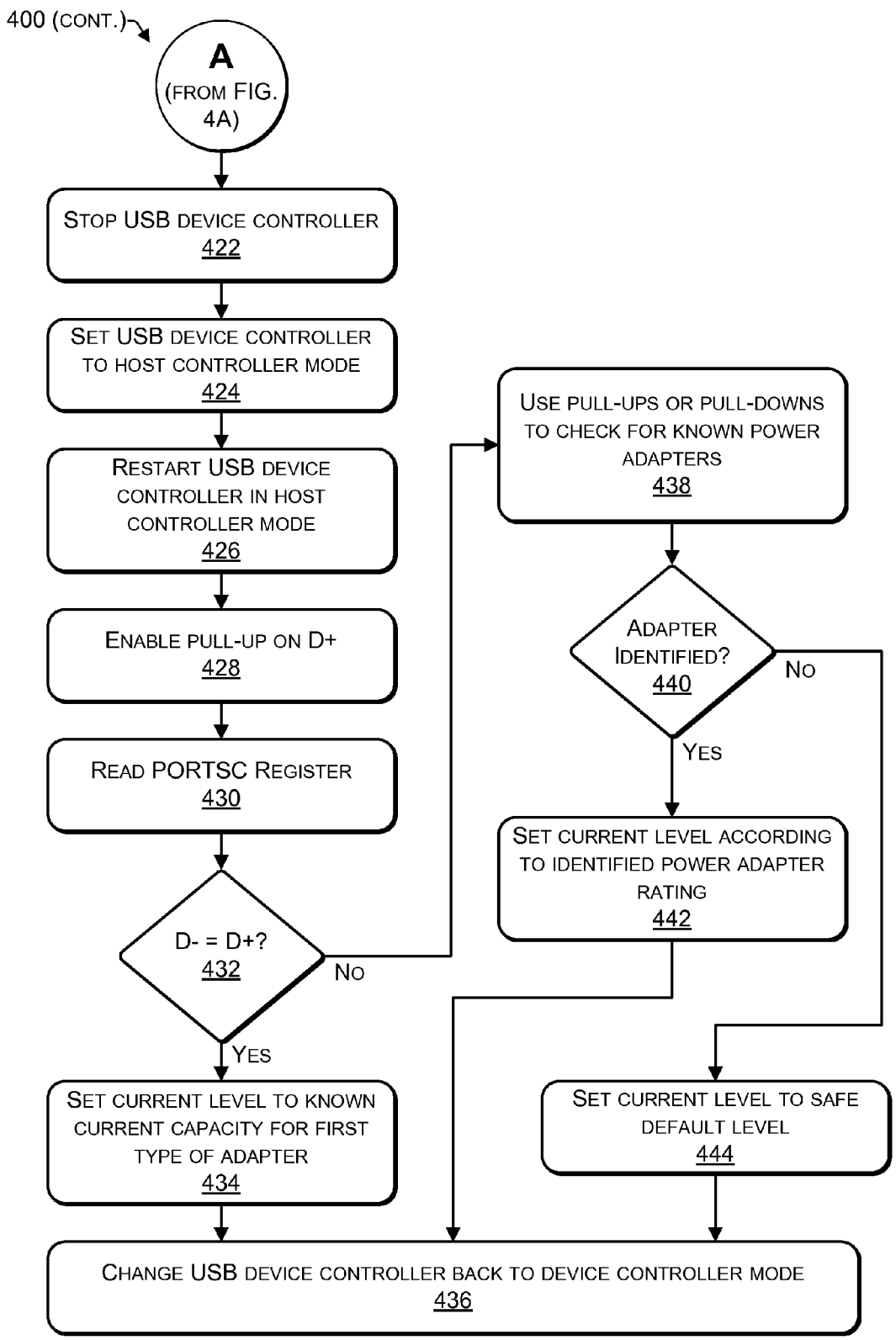

FIGS. 4A-4B illustrate an example process 400 for power management according to some implementations. The process 400 is described with reference to the device 100 of FIGS. 1 and 3, although other devices, architectures and systems may implement this process.

At block 402, the device 100 may detect that a power source has been connected to the device. For example, the PMIC 112 may detect through the USB device controller 106 that a power source 126 has been connected to the USB port 110. The PMIC 112 may notify the power management module 102 that the power source 126 has been connected to the USB port 110, such as by sending an interrupt to the power management module 102. In response, the power management module 102 may check with the PMIC 112 to confirm that the power source 126 is connected, such as by reading a PMIC charging status register maintained by the PMIC 112.

At block 404, the power management module 102 may determine whether the D+ and D− lines are indicated to be shorted or possibly floating. For example, the power management module 102 may determine from the USB device controller 106 whether the D+ and D− lines are indicated as being shorted. In some implementations, the power management module 102 may check the PORTSC register 132 in the USB controller register 114 to determine whether the LS bits for the D+ and D− lines are both set to a value of "1," and if so, the power management module 102 may assume that the D+ and D− lines are either shorted or floating. For example, if the lines are shorted, then the value on the two lines will be the same. Additionally, if the lines are floating, the value may be the same because no pull-up is applied on either of the D+ and D− lines.

At block 406, if the power management module 102 determines that the D+ and D− lines are not shorted/floating, then in some implementations the power management module 102 assumes that the power source is a host USB port on another device such as a PC, hub, or the like, and the process goes to block 408. For example, the D+ and D− lines should not be shorted when a PC or hub is connected to the device 100. On the other hand, if the power management module 102 determines that the D+ and D− lines are shorted or floating, then in some implementations herein, the power management module 102 assumes that the device 100 is connected to a power adapter, and the process goes to block 422 of FIG. 4B.

At block 408, the power management module 102 may check for the J-State in the PORTSC register 132. For example, the USB standard provides for a number of different USB bus states. In a differential "1" bus state, D+ is high and D− is low. On the other hand, in a differential "0" bus state D− is high and D+ is low. Further, the USB bus may also be in states referred to as a "J-State" or a "K-State." In the case of the J-State, one of the D+ or D− lines with a pull-up resistor is high and the other line is low, and the lines are being driven to that state by the host. The K-State is the opposite polarity to the J-State. Accordingly, the power management module 102 may check the USB controller register 114 for the J-State in the LS bits in the PORTSC register 132. For example, when the power management module 102 checks for the J-State in the LS bits, if a "10" exists (0x2 in hex) then the device 100 is connected to a low-speed USB port, and the power management module 102 may set the current level to 100 mA.

At block 410, the power management module 102 determines whether a J-State in the PORTSC register 132 indicated a low-speed port. If so, the process goes to block 412; if not, the process goes to block 414.

At block 412, when the power management module 102 determines that the port is a low-speed port, in some implementations, the power management module 102 sets the level of current to be drawn to 100 mA.

At block 414, the power management module 102 may check for the K-State in the PORTSC register 132. For example, when the power management module 102 checks for the K-State in the LS bits, if a "01" exists (0x1 in hex) then the device is connected to a full-speed or high-speed USB port, and the power management module 102 may check a connect status bit in the PORTSC register 132 to determine whether the port is a high speed port. In the case of a hub having a high-speed port, the connect status bit is set immediately in the PORTSC register 132 upon connection to the hub to indicate that the port is a high-speed port. In the case of a PC having a high-speed port, the connect status bit is set in the PORTSC register 132 after a PC enumeration period to indicate that the port is a high-speed port. Accordingly, in some implementations, the power management module 102 waits a predetermined period of time before checking the connect status bit.

At block 416, the power management module 102 determines whether the connect status bit indicated that the port is a high-speed port. If the port is a high-speed port, the process goes to block 418. On the other hand, if the port is a full-speed port, the process goes to block 420.

At block 418, when the power management module 102 determines that the port is a high-speed port, in some implementations the power management module 102 sets the current level to 500 mA.

At block 420, when the power management module 102 determines that the port is a full-speed port, in some implementations the power management module 102 sets current level to 100 mA.

FIG. 4B illustrates a continuation of the process 400 starting at block 422, as continued from block 406 of FIG. 4A.

At block 422, in order to determine whether the D+ and D− lines are shorted or floating, the power management module 102 stops the USB device controller 106. For example, the power management module 102 may send a signal to the USB device controller driver 104, which causes the USB device controller driver 104 to halt operation of the USB device controller 106.

At block 424, the USB device controller driver 104 sets the USB device controller 106 to the host controller mode, such as by implementing the USB host mode module 318 on the USB device controller 106.

At block 426, the USB device controller driver 104 restarts the USB device controller in the host controller mode.

At block 428, the power management module 102 instructs the USB device controller driver 104 to enable a pull-up on the D+ line. Alternatively, in other implementations, the pull-up may be on the D− line. Still alternatively, a pull-down may be applied to one of the D+ or D− lines.

At block 430, the power management module 102 reads the PORTSC register to determine the state of the D− line. Alternatively, if the pull-up was placed on the D− line, the power management module 102 determines the state of the D+ line. Still alternatively, if a pull-down was placed on one of the D+ or D− lines, the power management module 102 determines the state of the other of the D+ or D− line.

At block 432, the power management module 102 determines whether the D+ line is equal to the D− line. If so, this indicates that the D+ and D− lines are shorted and the process goes to block 434 and if not, this indicates that the D+ and D− lines are floating, and the process goes to block 438.

At block 434, when the D+ line is equal to the D− line, then the D+ and D− lines are shorted, which indicates that the first type of power adapter 126-1 is connected. Accordingly, the power management module 102 may send a signal to the PMIC 112 to set the level of current to be drawn to a known current level for the first type of power adapter 126-1. For example, in some implementations, the current level may be set between 800 and 1000 mA. In some particular implementations, the current level may be set to 880 mA. Thus, the current to be drawn from the power source may be set to a predefined current range or minimum level specified for power adapters having shorted D+ and D− lines; however, implementations herein are not limited to any particular current level.

At block 436, when the identity of the power adapter has been established, the power management module 102 may send a signal to the USB device controller driver 104 to stop the operation of the USB device controller 106 and reset the USB device controller 106 back to the device controller mode to enable the USB port 110 of the device 100 to operate properly in a device mode.

At block 438, when the D+ line is not equal to the D− line, then the D+ and D− lines are floating, which indicates that the second or third type of power adapter is connected to the USB port 110. The power management module 102 may use various different pull-up or pull-down values to check for known second type power adapters 126-2. For example, when the D+ line is pulled up to a first value, a first model of the second type of power adapter 126-2 may provide a particular value on the D− line, while a second model of the second type of power adapter 126-2 may provide a different value on the D− line. Accordingly, by applying different pull-up or pull-down values on one of the D+ or D− lines, and determining the state of the other of the D+ and D− lines in response to the pull-up or pull-down value, known second type of power adapters 126-2 may be positively identified. In some implementations, as discussed above, the power management module 102 may refer to PA table 326 when attempting to identity a connected power adapter.

At block 440, when the power source has been positively identified as a known model of power adapter of the second type 126-2, the process goes to block 442. On the other hand, when the power source 126 cannot be positively identified, the power adapter is assumed to be of the third type 126-3, and the process goes to block 444.

At block 442, when a second type of power adapter 126-2 has been positively identified, the power management module 102 may obtain the rated current level for the identified power adapter from the PA table 326 or other suitable source. The power management module 102 may then provide the specified level of current to be drawn from the power adapter to the PMIC 112. Following identification of the power adapter, the process may go to block 436 to reset the USB device controller back to device controller mode.

At block 444, when the power adapter is of the third type 126-3 that cannot be positively identified, the power management module 102 instructs the PMIC 112 to set the current level to a safe default level. For example, in some implementations, a safe default level may be 500 mA. Following determining of the current level, the process may go to block 436 to reset the USB device controller back to device controller mode.

While the disclosure herein sets forth several examples of electronic devices and power management techniques for discussion purposes herein, other implementations are not limited to any particular device, power settings, purpose or intended use. Numerous possible variations will be apparent to those of skill in the art in light of the disclosure herein.

Example Instructions

An example of computer-readable, processor-executable instructions for performing power management according to some implementations herein is set forth below. The instructions set forth below generally correspond to blocks 422-436 and 444 of FIG. 4B.

```
static int do_third_party_charger(void)
{
    unsigned int portsc1, tmp;
    unsigned long timeout;
    int charger = 0;
#define FSL_UDC_RESET_TIMEOUT 1000
    /* Stop and reset the usb controller */
    tmp = fsl_readl(&dr_regs->usbcmd);
    tmp &= ~USB_CMD_RUN_STOP;
    fsl_writel(tmp, &dr_regs->usbcmd);
    tmp = fsl_readl(&dr_regs->usbcmd);
    tmp |=USB_CMD_CTRL_RESET;
    fsl_writel(tmp, &dr_regs->usbcmd);
    /* Wait for reset to complete */
    timeout = jiffies + FSL_UDC_RESET_TIMEOUT;
    while (fsl_readl(&dr_regs->usbcmd) &
USB_CMD_CTRL_RESET) {
        if (time_after(jiffies, timeout)) {
            ERR("udc reset timeout! \n");
            return -ETIMEDOUT;
        }
        cpu_relax( );
    }
    /* Set the controller as HOST mode */
    tmp = fsl_readl(&dr_regs->usbmode);
    tmp &= ~USB_MODE_CTRL_MODE_MASK;
    /* clear mode bits */
    tmp |= USB_MODE_CTRL_MODE_HOST;
    /* Disable Setup Lockout */
    tmp |= USB_MODE_SETUP_LOCK_OFF;
    fsl_writel(tmp, &dr_regs->usbmode);
    /* Restart the controller */
    tmp = fsl_readl(&dr_regs->usbcmd);
    tmp |= USB_CMD_RUN_STOP;
    fsl_writel(tmp, &dr_regs->usbcmd);
    /* Let things settle down */
    mdelay(100);
    /* Disregard the clock accuracy */
    USB_PHY_CTR_FUNC2 = 0x02;
    /*
    * The PHY may include a vendor control register
    * at address 0x0, i.e. VCTL_ADDR=0x0
    */
    USB_PHY_CTR_FUNC &= 0xfff002ff;
    /*
    * Put 0x2 in the vendor control register to enable pull-up on
    * DP, i.e. VCTL_DATA=0x2
    */
    USB_PHY_CTR_FUNC |=0x00100200;
    /*
    * Enable the load, i.e. VCTL_LOAD=0x0
    */
    USB_PHY_CTR_FUNC &=0xfFE002ff;
    mdelay(100);
    /*
    * Disable load, i.e. VCTL_LOAD=0xl
    */
    USB_PHY_CTR_FUNC |=0xfff00200;
    /* Now read the PHY port register */
    portsc1 = fsl_readl(&dr_regs->portsc1);
    printk(KERN_INFO "do_third_party_charger: portsc1 = 0x%x\n",
portsc1);
    if ((portsc1 & PORTSCX_LINE_STATUS_BITS) ==
PORTSCX_LINE_STATUS_UNDEF) {
        /* D+ and D- are shorted, hence charger */
        charger = 1;
    }
```

```
    /* Clear Dp-pull-up enable */
    USB_PHY_CTR_FUNC &=0xfff000ff;
    /* Open latch */
    USB_PHY_CTR_FUNC &=0xffe000ff;
    mdelay(10);
    /* Close latch */
    USB_PHY_CTR_FUNC |= 0x00100000;
    /* Re-enable the clock accuracy */
    USB_PHY_CTR_FUNC2 = 0x0;
    /* Stop and reset the usb controller */
    tmp = fsl_readl(&dr_regs->usbcmd);
    tmp &= ~USB_CMD_RUN_STOP;
    fsl_writel(tmp, &dr_regs->usbcmd);
    tmp = fsl_readl(&dr_regs->usbcmd);
    tmp |= USB_CMD_CTRL_RESET;
    fsl_writel(tmp, &dr_regs->usbcmd);
    /* Wait for reset to complete */
    timeout = jiffies + FSL_UDC_RESET_TIMEOUT;
    while (fsl_readl(&dr_regs->usbcmd) &
USB_CMD_CTRL_RESET) {
        if (time_after(jiffies, timeout)) {
            ERR("udc reset timeout! \n");
            return -ETIMEDOUT;
        }
        cpu_relax( );
    }
    /* Set the controller as device mode */
    tmp = fsl_readl(&dr_regs->usbmode);
    tmp &= ~USB_MODE_CTRL_MODE_MASK;
    /* clear mode bits */
    tmp |=USB_MODE_CTRL_MODE_DEVICE;
    /* Disable Setup Lockout */
    tmp |=USB_MODE_SETUP_LOCK_OFF;
    fsl_writel(tmp, &dr_regs->usbmode);
    tmp = fsl_readl(&dr_regs->usbcmd);
    tmp |= USB_CMD_RUN_STOP;
    fsl_writel(tmp, &dr_regs->usbcmd);
    mdelay(100);
```

In some implementations, the foregoing instructions may be converted to machine code and executed on the one or more processors 302 for implementing at least a portion of the power management techniques described herein. Further, while example instructions have been provided herein, numerous variations will be apparent to those of skill in the art in view of the disclosure herein. Accordingly, implementations herein are not limited to any particular instructions.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A device comprising:
   a universal serial bus (USB) port having a D+ line and a D− line;
   a USB device controller configured to operate in a host controller mode and a device controller mode;
   one or more processors operatively coupled to a computer readable medium; and
   a power management module maintained on the computer-readable medium and executed on the one or more processors to perform operations including:
   detecting that a power source is connected to the USB port;

based at least in part on determining that the D+ and D− lines are at least one of shorted or floating, setting the USB device controller to operate in the host controller mode;

determining, based at least in part on a pull-up or pull-down placed on one of the D+ or D− lines, whether the D+ and D− lines are shorted or floating; and when the D+ and D− lines are shorted, identifying the power source as being a type of power adapter capable of providing a known level of current.

2. The device as recited in claim 1, the setting the USB device controller to operate in the host controller mode further comprising:

stopping the USB device controller while the USB device controller is configured to operate in the device controller mode; and restarting the USB device controller in the host controller mode to enable the USB device controller to place the pull-up or pull-down on the one of the D+ or D− lines.

3. The device as recited in claim 1, wherein:

the USB device controller further comprises a register indicating a state of the D+ and D− lines when the power source is connected to the USB port; and the power management module performing operations further comprising:

prior to setting the USB device controller to operate in the host controller mode, determining, at least in part from the register, that the D+ and D− lines are indicated to be at least one of shorted or floating.

4. The device as recited in claim 3, the determining, at least in part from the register, that the D+ and D− lines are indicated to be at least one of shorted or floating further comprising checking values of a pair of line status bits in the register.

5. The device as recited in claim 1, the power management module performing operations further comprising, when the D+ and D− lines are floating, attempting to identify, based at least in part on at least one of the pull-up or pull-down on at least one of the D+ and D− lines, a particular power adapter as the power source.

6. The device as recited in claim 5, the power management module performing operations further comprising referring to a power adapter information table to compare values of the D+ and D− lines with values previously determined for known adapter models to attempt to identify the particular power adapter.

7. The device as recited in claim 5, the power management module performing operations further comprising, when the attempting to identify the particular power adapter fails, setting a level of current to be drawn from the power source to a default level of current, lower than the known level of current.

8. The device as recited in claim 1, further comprising a power management integrated circuit (PMIC), the PMIC configured to receive an instruction from the power management module for setting a level of current to be drawn from the power source based, at least in part, on the known level of current.

9. The device as recited in claim 1, wherein the determining whether the D+ and D− lines are shorted or floating comprises determining that the D+ and D− lines are shorted when the pull-up or pull-down placed on a first one of the D+ or D− lines results in a second one of the D+ and D− lines following the first one.

10. A method comprising:

under control of an electronic device configured with specific executable instructions and having a universal serial bus (USB) port, connecting a power source to the USB port, the USB port including a D+ line and a D− line;

based at least in part on determining that the D+ and D− lines are at least one of shorted or floating, stopping a USB device controller operating in a client controller mode;

restarting the USB device controller in a host controller mode; and applying a pull-up or pull-down on one of the D+ or D− lines of the USB port to determine whether the D+ and D− lines are shorted.

11. The method as recited in claim 10, further comprising, prior to the stopping the USB device controller, accessing a register of the USB device controller; and determining, at least in part from the register, that the D+ and D− lines are indicated to be at least one of shorted or floating.

12. The method as recited in claim 11, the determining, at least in part from the register, that the D+ and D− lines are indicated to be at least one of shorted or floating further comprising checking values of a pair of line status bits in the register.

13. The method as recited in claim 10, further comprising:

prior to stopping the USB device controller, accessing a register of the USB device controller; and determining, that the power source is not a host USB port on another device.

14. The method as recited in claim 10, further comprising, following a decision that the D+ and D− lines are shorted, setting a current level to be drawn from the power source to a known current level.

15. The method as recited in claim 14, wherein the known current level is greater than or equal to 880 milliamps.

16. The method as recited in claim 10, further comprising, following a decision that the D+ and D− lines are not shorted, attempting to identify the power source as a known power adapter based at least in part on a value determined for one of the D+ and D− lines in response to the pull-up or pull-down applied on the other of the D+ and D− lines.

17. The method as recited in claim 16, further comprising:

positively identifying the known power adapter based at least in part on applying a plurality of pull-ups or pull-downs of different values to at least one of the D+ and D− lines; and comparing values of the D+ and D− lines with previously determined values for particular known power adapters.

18. The method as recited in claim 17, wherein the comparing further comprises comparing values of the D+ and D− lines with values for a plurality of known power adapters previously determined and stored in a power adapter information table.

19. The method as recited in claim 16, further comprising, when the attempting to identify the power source as a known power adapter is unsuccessful, setting a level of current to be drawn from the power source to a default level of current.

20. One or more non-transitory computer-readable media having instructions recorded thereon, the instructions executable by a processor to program a device to perform operations comprising:

detecting that a power source is connected to a universal serial bus (USB) port of the device, the USB port including a D+ line and a D− line;

based at least in part on determining that the power source is not a host USB port of another device, setting a USB device controller of the device to operate in a host controller mode;

in the host controller mode, applying a pull-up or pull-down on one of the D+ or D− lines of the USB port; and determining from a comparison of values of the D+ and D− lines whether the D+ and D− lines are floating.

21. The one or more non-transitory computer-readable media as recited in claim 20, wherein applying the pull-up or pull-down further comprises connecting a resistor of a known resistance between the one of the D+ or D− lines and a voltage source or voltage drain, respectively.

22. The one or more non-transitory computer-readable media as recited in claim 20, the operations further comprising, when the D+ and D− lines are not determined to be floating, setting a level of current to be drawn from the power source to a predefined current level for power adapters having shorted D+ and D− lines.

23. The one or more non-transitory computer-readable media as recited in claim 20, the operations further comprising, when the D+ and D− lines are determined to be floating, determining whether the power source is a known power adapter based, at least in part, on comparing the values of the D+ and D− lines with one or more stored values of D+ and D− lines for one or more known power adapters.

24. The one or more non-transitory computer-readable media as recited in claim 23, the operations further comprising, when the power source is not identified as a known power adapter, setting a default current level to be drawn from the power source.

25. The one or more non-transitory computer-readable media as recited in claim 20, the operations further comprising, following a determination of a current level to be drawn from the power source, resetting the USB device controller to operate in a device controller mode.

\* \* \* \* \*